United States Patent
Young

(10) Patent No.: US 8,655,875 B2
(45) Date of Patent: Feb. 18, 2014

(54) SYSTEM AND METHOD FOR TRANSFORMING BUSINESS PROCESS POLICY DATA

(75) Inventor: Alan Young, Mount Sinai, NY (US)

(73) Assignee: CA, Inc., Islandia, NY (US)

( * ) Notice: Subject to any disclaimer, the term of this patent is extended or adjusted under 35 U.S.C. 154(b) by 1935 days.

(21) Appl. No.: 10/899,718

(22) Filed: Jul. 26, 2004

(65) Prior Publication Data

US 2005/0160361 A1 Jul. 21, 2005

Related U.S. Application Data

(63) Continuation of application No. 10/188,484, filed on Jul. 3, 2002, now abandoned.

(60) Provisional application No. 60/303,143, filed on Jul. 5, 2001.

(51) Int. Cl.
*G06F 17/30* (2006.01)

(52) U.S. Cl.
USPC .......................................... 707/736; 707/756

(58) Field of Classification Search
USPC ................ 707/10, 668, 694, 736, 756; 705/8; 715/513
See application file for complete search history.

(56) References Cited

U.S. PATENT DOCUMENTS

| | | | |
|---|---|---|---|
| 4,930,071 A | 5/1990 | Tou et al. | 364/300 |
| 5,297,279 A * | 3/1994 | Bannon et al. | 707/792 |
| 5,629,846 A * | 5/1997 | Crapo | 708/705 |
| 5,956,688 A | 9/1999 | Kokubo et al. | 705/1 |
| 6,009,436 A * | 12/1999 | Motoyama et al. | 707/102 |
| 6,073,139 A * | 6/2000 | Jain et al. | 1/1 |
| 6,125,391 A | 9/2000 | Meltzer et al. | 709/223 |
| 6,339,775 B1 * | 1/2002 | Zamanian et al. | 1/1 |
| 2002/0188486 A1 * | 12/2002 | Gil et al. | 705/7 |
| 2003/0229529 A1 * | 12/2003 | Mui et al. | 705/8 |

OTHER PUBLICATIONS

Notification of Transmittal of the International Search Report or the Declaration; International Application No. PCT/US02/21028, mailed Mar. 18, 2003.

* cited by examiner

*Primary Examiner* — Etienne Leroux
*Assistant Examiner* — Fariborz Khoshnoodi
(74) *Attorney, Agent, or Firm* — Baker Botts, LLP

(57) ABSTRACT

A system that facilitates interactions between heterogeneous information providers, business process policies, and business process policy objects is provided. The system includes a translation services logic that accepts data format definitions and rules for transforming, translating, converting, reordering, merging, splitting and other operations that adapt one data format to another data format. The translation services logic produces a mapping rule object (MRO) for performing the adaptation(s).

30 Claims, 11 Drawing Sheets

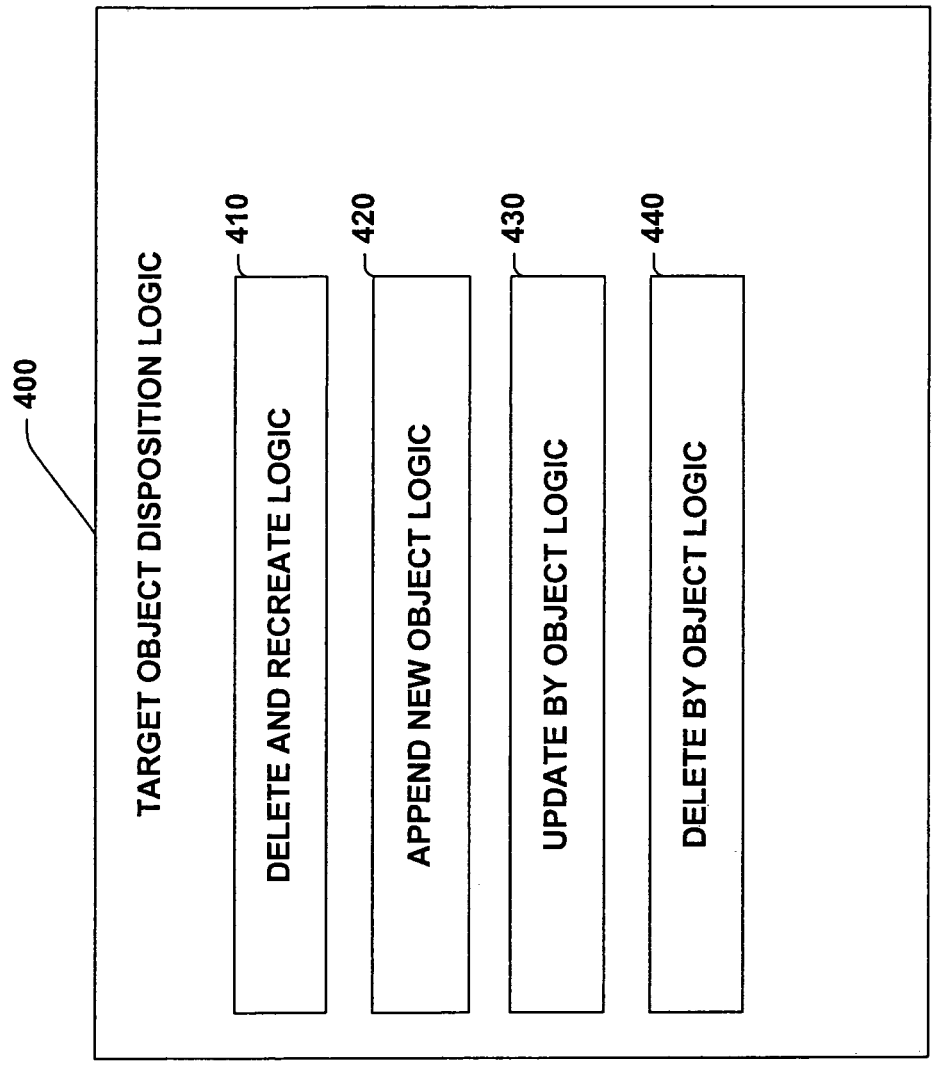

SYSTEM AND METHOD FOR TRANSFORMING BUSINESS PROCESS POLICY DATA

CROSS REFERENCE TO RELATED APPLICATIONS

This application is a continuation of U.S. application Ser. No. 10/188,484, entitled "System and Method for Transforming Business Process Policy Data" filed Jul. 3, 2002 now abandoned and further claims priority to U.S. provisional application entitled "System and Method for Transforming and Translating Services for Business Process Policies," Ser. No. 60/303,143, filed Jul. 5, 2001, which is incorporated herein by reference.

TECHNICAL FIELD

The methods, systems, and computer readable media described herein relate generally to computer programming and more particularly to converting data from one format to another.

BACKGROUND OF THE INVENTION

The emerging e-business paradigm is challenged by the need to eliminate boundaries between information providers and formats to facilitate increasing business value for organizations. One e-business paradigm that faces this challenge is the enterprise application integration (EAI) environment. In the enterprise application integration environment, data and/or business events that are shared between integrated applications may be commonly representable. However, receiving data from sources outside the pre-defined EAI environment and/or interacting with new applications can confound inflexible conventional EAI applications. Furthermore, some information providers may be unwilling to tailor their data to each EAI common representation.

Thus, e-business and other applications can benefit from improved data transformation, translation, mapping, and/or adaptation systems and methods that facilitate converting data between different formats and increasing interactions between applications.

SUMMARY OF THE INVENTION

The following presents a simplified summary of methods, systems, and computer readable media associated with translating, transforming, adapting, and/or reformatting business process policy data. This summary is not an extensive overview and is not intended to identify key or critical elements of the methods, systems, and/or media or to delineate the scope of the methods, systems, and media. It conceptually identifies the methods, systems, and media in a simplified form as a prelude to the more detailed description that is presented later.

The systems and methods described herein facilitate different information providers collaborating through a seamless layer where operations like mapping, translating, reformatting and so on occur. These operations facilitate sharing information formatted and provided in different formats and/or representations, for example. The systems and methods can be practiced in an object based environment where data transformation becomes a general purpose, parameter driven service that can be programmatically interfaced in a variety of manners.

In one example, a system for transforming a first data in a first format (e.g., source format) to a second data in a second format (e.g., destination format) is provided. The system includes a translation services logic that takes data definitions and data transformation rules as inputs. The translation services logic then produces a mapping rule object (MRO). The MRO transforms data between formats by applying the data transformation rules to received data. One example MRO includes a source logic that identifies a source from which the first data will be received and a destination logic that identifies the destination to which the second data will be provided. An MRO can also include a rule logic for transforming data and a source filter rule logic for selecting data to be transformed.

An MRO can also include a translation form logic that facilitates controlling the form a mapping rule object will take. An MRO can also include a post translation execution logic that specifies which, if any, business process policies, objects, MROs, and so on to invoke after a MRO completes transforming a first data to a second data. An MRO may also include a target object disposition logic that facilitates controlling how pre-existing objects and objects created by an MRO should interact.

An MRO can have its operations controlled by parameterized input to the MRO and/or one or more of its logics. Thus, an MRO can include a parameter interface to facilitate receiving parameters that selectively control the MRO and/or its logics. Similarly, an MRO can include a programmatic interface for receiving commands and/or data from entities like an application programming interface (API), a command line interface (CLI), a graphical user interface (GUI), a business process policy, a business process policy object, and so on.

In another example, a computer implemented method for adapting business process policy data is described. The method includes defining a business process policy data format and a set of rules for translating the format to or from other format(s). The method also includes creating a mapping rule object that performs the adaptation between formats by applying the set of rules. Once an MRO has been created it can receive a first data in a first format, adapt the first data to a second data in a second format and then provide the second data to another computer component (e.g., application, business process policy, MRO). Alternatively, and/or additionally, the method can analyze the first format, the second format, and/or rules employed to transform the data to determine whether to selectively invoke a business process policy and/or a mapping rule object. Adapting the first data to the second data can include, but is not limited to, creating new objects, updating existing objects, and/or deleting existing objects. The existing objects may have been created, for example, by a prior operation of a mapping rule object. Furthermore, adapting the first data to the second data can include adding, deleting, merging, updating, and/or creating fields, values, records, entries, and so on in an object or a data structure.

Certain illustrative aspects of the methods, systems, and computer readable media are described herein in connection with the following description and the annexed drawings. These aspects are indicative, however, of but a few of the various ways in which the principles of the methods, systems, and media may be employed and thus the examples are intended to include such aspects and equivalents. Other advantages and novel features may become apparent from the following detailed description when considered in conjunction with the drawings.

BRIEF DESCRIPTION OF THE DRAWINGS

FIG. 4 illustrates an example target object disposition logic.

DETAILED DESCRIPTION

Figure 1:
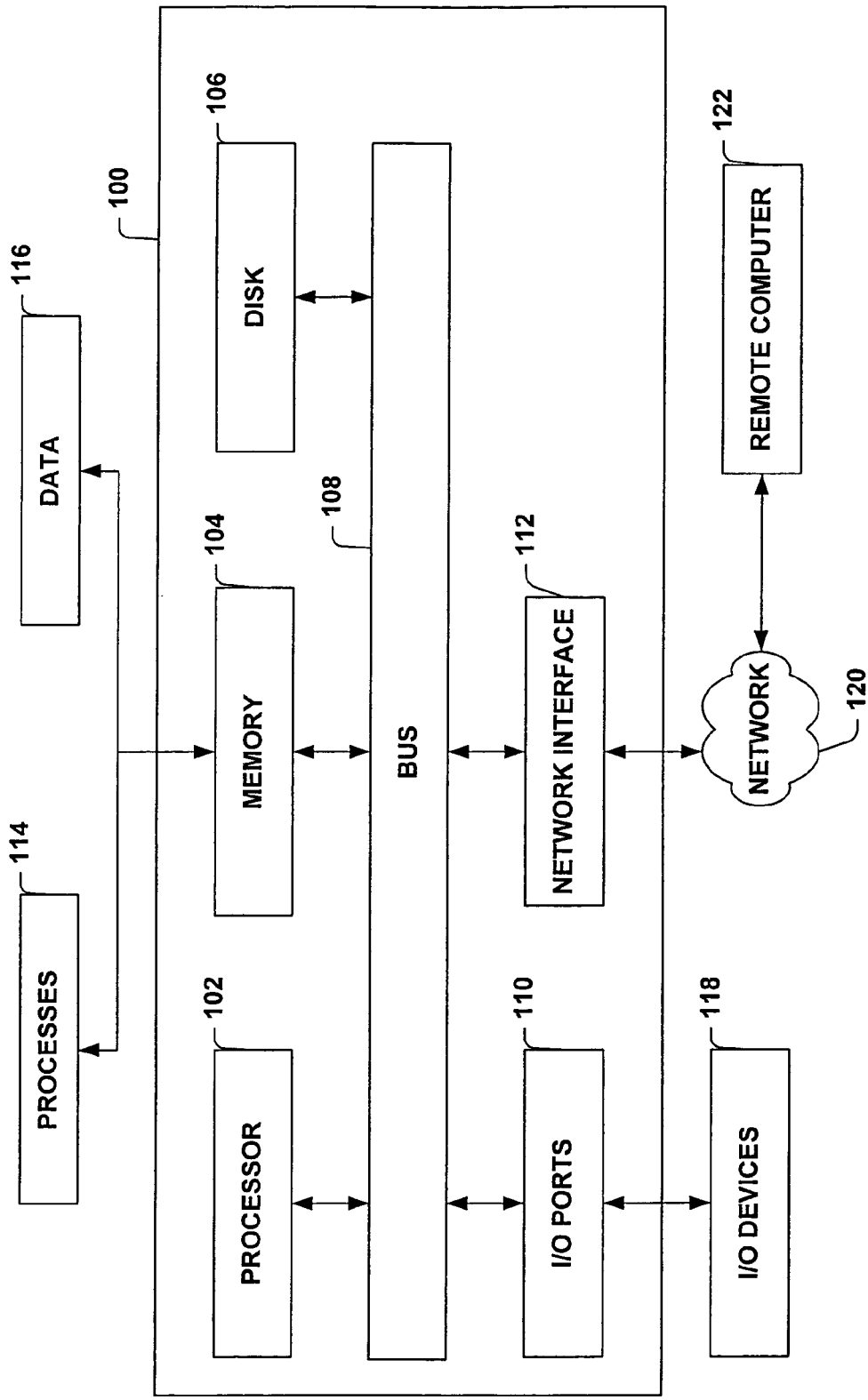
FIG. 1 illustrates an example computing environment with which example systems and methods can interact.

Example methods, systems, and computer readable media are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

FIG. 1 illustrates a computer 100 that includes a processor 102, a memory 104, a disk 106, input/output ports 110, and a network interface 112 operably connected by a bus 108. Executable components of the systems described herein may be located on a computer like computer 100. Similarly, computer executable methods described herein may be performed on a computer like computer 100. Furthermore, business process policy objects, mapping rule objects, and translation services may reside on a computer like computer 100 and/or be processed by a computer like computer 100. It is to be appreciated that other computers may also be employed with the systems and methods described herein.

The processor 102 can be a variety of various processors including dual microprocessor and other multi-processor architectures. The memory 104 can include volatile memory and/or non-volatile memory. The non-volatile memory can include, but is not limited to, read only memory (ROM), programmable read only memory (PROM), electrically programmable read only memory (EPROM), electrically erasable programmable read only memory (EEPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM). The disk 106 can include, but is not limited to, devices like a magnetic disk drive, a floppy disk drive, a tape drive, a Zip drive, a flash memory card, and/or a memory stick. Furthermore, the disk 106 can include optical drives like a compact disk ROM (CD-ROM), a CD recordable drive (CD-R drive), a CD rewriteable drive (CD-RW drive) and/or a digital versatile ROM drive (DVD ROM). The memory 104 can store processes 114 and/or data 116, for example. The disk 106 and/or memory 104 can store an operating system that controls and allocates resources of the computer 100.

The bus 108 can be a single internal bus interconnect architecture and/or other bus architectures. The bus 108 can be of a variety of types including, but not limited to, a memory bus or memory controller, a peripheral bus or external bus, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 100 interacts with input/output devices 118 via input/output ports 110. The input/output devices 118 can include, but are not limited to, a keyboard, a microphone, a pointing and selection device, cameras, video cards, displays, and the like. The input/output ports 110 can include but are not limited to, serial ports, parallel ports, and USB ports.

The computer 100 can operate in a network environment and thus is connected to a network 120 by a network interface 112. Through the network 120, the computer 100 may be logically connected to a remote computer 122. The network 120 includes, but is not limited to, local area networks (LAN), wide area networks (WAN), and other networks. The network interface 112 can connect to local area network technologies including, but not limited to, fiber distributed data interface (FDDI), copper distributed data interface (CDDI), ethernet/IEEE 802.3, token ring/IEEE 802.5, wireless/IEEE 802.11 and the like. Similarly, the network interface 112 can connect to wide area network technologies including, but not limited to, point to point links, and circuit switching networks like integrated services digital networks (ISDN), packet switching networks, and digital subscriber lines (DSL).

Figure 2:
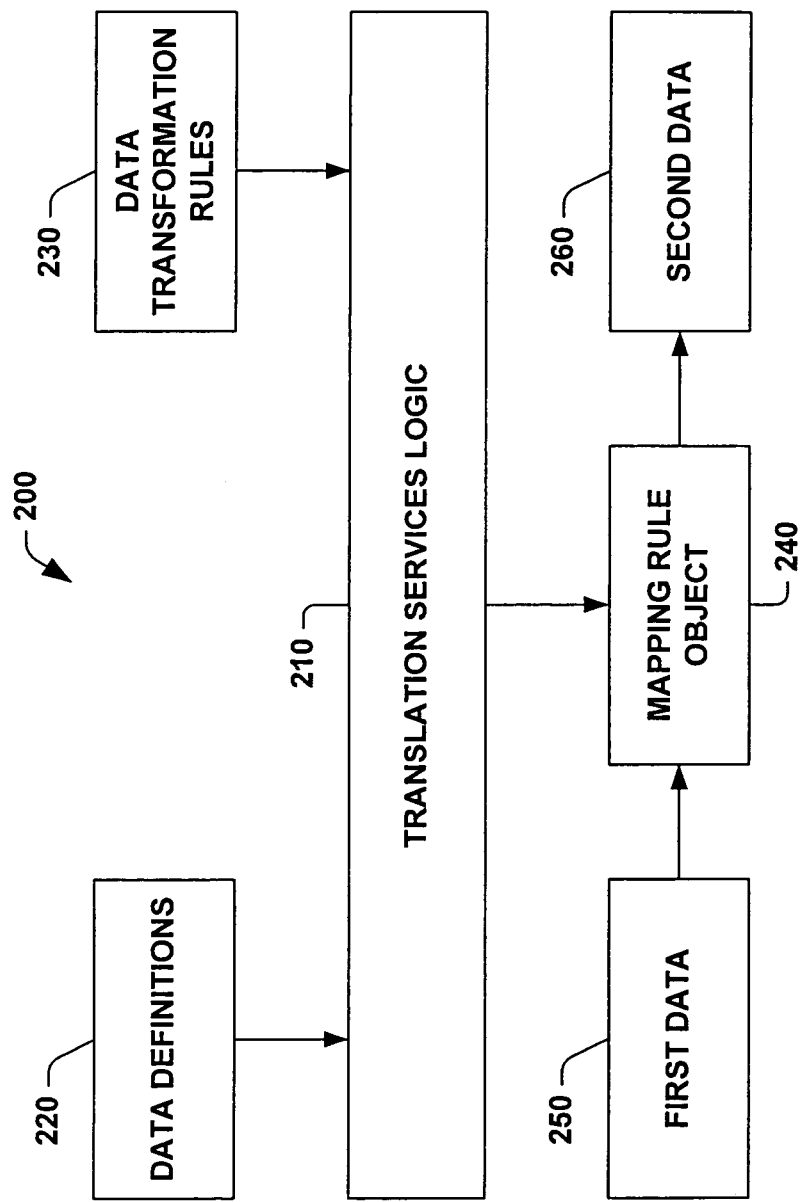
FIG. 2 illustrates an example system for transforming business process policy data.

Turning now to FIG. 2, an example system 200 for transforming business process policy data is illustrated. Transforming data includes actions like adding, deleting, updating, changing, reordering, and resizing names, values, types, fields, record objects and so on. The specifics of transforming one data in one format to another data in another format will, of course, be dictated by the relationships, similarities and differences between the formats.

FIG. 2 illustrates a system 200 that includes a mapping rule object 240 that facilitates transforming data between formats. General purpose mapping rule objects facilitate actions like translating, transforming, adapting, reordering, and so on, of data from one format to another (e.g., source format to destination format). Data properties including, but not limited to, a data type, a data name, and a data value, can be transformed by a general purpose mapping rule object to facilitate interactions between different information providers processes, objects and so on in a system. Thus, the system 200 facilitates integrating business data and/or business events from various information providers for various points in time. The business data received from the information providers can include, but is not limited to, production data, pricing data, local event data, general economic forecast data, news data, order data, inventory data, prediction data, and so on. The information providers can include, but are not limited to, local business computers, remote business computers, voice mail servers, email servers, news servers, business intelligence providers (e.g., CNN, D&B, Hoover), data analysis and intelligence extraction providers (e.g., EBR, NLP), neural network agents, bots (e.g., weather, traffic, business), supplier computers, customer computers, and so on. The various points in time for which an information provider can provide data and/or business events include, but are not limited to, historical points in time, a current point in time, and future points in time (e.g., calculated values, computer predicted values, human forecast values).

The data received from the information providers can be located in a business event and processed by a business process policy and/or a business process policy object. A business process policy object can model and implement intelligence like decision making applied in understanding, analyzing, and/or responding to business events, for example. One example business event can be a message between an information source and an intended target (e.g., workflow manager, enterprise monitor) that describes a significant business activity. Business events may be modeled, for example, in objects, and can be communicated to business process policy objects via, for example, computer communications and/or object oriented messaging. Business events can be associated with business logic processing and can be involved, for example, in reporting a state, in noting a status change, in providing data, and so on.

A business process policy object can facilitate automatically performing actions including, but not limited to, responding to an inventory change, predicting sales activity, generating appropriate discounts, and scheduling deliveries. These and similar actions can be triggered by business events and/or messages, for example. These business events and business process policies receive and process data from a variety of sources (e.g., information providers).

Types of business events for which a business process policy object can implement logic, and thus for which data conversions may be required include, but are not limited to, reference events, change events, threshold events, task completion events, and task failure events. An example reference event, which may be a discrete event, can provide information like a date when a company files a financial disclosure or a notification that a company has filed its financial disclosure. A change event can be employed to relate items of prior intelligence that have not been related to other events. For example, a change event may provide information concerning when a product price page changes, or when a company stock price changes. A threshold event facilitates simple levels of correlation between current knowledge and prior knowledge. For example, a threshold event may provide information concerning when a company's stock price has gone up or down ten percent over the previous price. A task completion event relates to business process intelligence and thus may provide information concerning when an on-going task has completed (e.g., informing a business process policy object that a financial disclosure data download has completed).

Business logic can be selectively performed. Business logic processing can include, but is not limited to, invoking one or more methods of a business process policy object, accessing one or more data items of a business process policy object, and/or updating one or more of the data items. Since the data may be received from a variety of sources, this application describes using mapping rule objects (MROs) to facilitate converting business process policy data between various formats.

Analyzing business data and/or business events facilitates determining and/or resolving problems in a business environment by facilitating actions like predicting problems, planning for problems, budgeting, scheduling, and so on. The business event and/or the data provided from the information providers can be received via a signal and/or computer communication for example. Since the various information providers, and the applications that process the data from the information providers may have different data format requirements, general purpose mapping rule objects that provide translation/transformation services facilitate integrating such applications. Furthermore, the MROs facilitate spanning hardware computing platforms, operating systems, networks, applications, processes, interfaces, and so on.

The system 200 includes a translation services logic 210. While a single translation services logic 210 is illustrated, it is to be appreciated that the translation services logic 210 can reside in a single computer component and/or be distributed between two or more communicating, cooperating computer components. The translation services logic 210 receives data definitions 220 and data transformation rules 230 and produces a mapping rule object 240.

The data definitions 220 can include information concerning a data type, a data name, a data value, and so on. For example, on a first system, a data type may be known as an integer data type. The name of instances of the integer data type may be limited to 8 characters. Furthermore, the value of instances of this data type may range from 0 to 255. In a second system, the data definition 220 for a similar range of values may be known as the type "short integer", and instances of this data type may have names that can be up to 16 characters in length. Thus, one or more data transformation rules 230 are provided to the translation services logic 210 to facilitate converting from the first data type to the second data type. While a simple integer conversion is described above, it is to be appreciated that translations/transformations for simple data types, complex data types, objects, records, and so on, may be provided to the translation services logic 210.

The system 200 facilitates transforming a first data 250 that is formatted in a first format (e.g., a source format) to a second data 260 formatted in a second format (e.g., destination format). The mapping rule object 240 performs the transformation according to the data definition 220 and the data transformation rules 230 provided to the translation services logic 210 and encoded in the mapping rule object 240. The translation services logic 210 accepts the data definitions 220 and the data transformation rules 230 and produces the mapping rule object 240 so that the mapping rule object 240 can be invoked to perform the transformation of the first data 250 to the second data 260.

Figure 3:
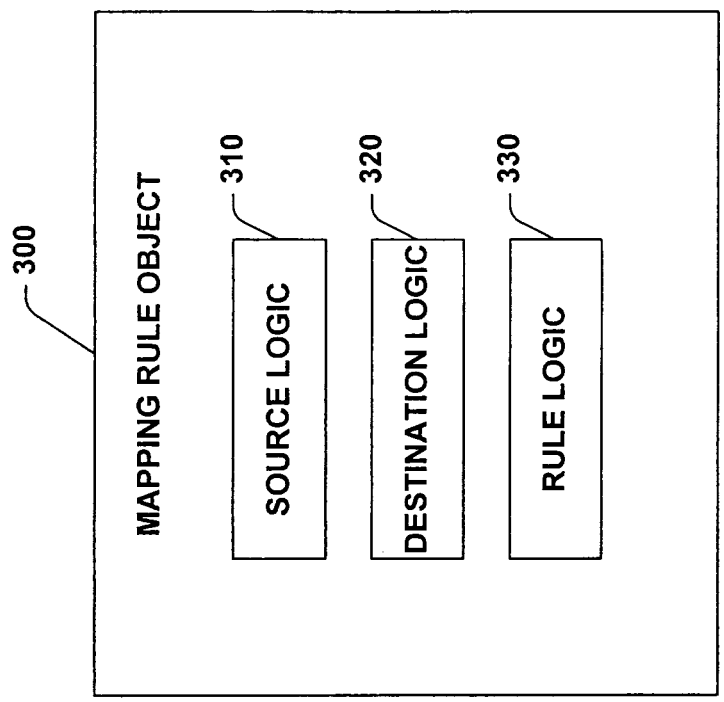
FIG. 3 illustrates an example mapping rule object.

FIG. 3 illustrates an example mapping rule object 300. The mapping rule object 300 includes a source logic 310 for identifying a source from which a source data will be received. The source can be, for example, an information provider including, but not limited to, an Advantage Integration Server (formerly known as Jasmine ii) entity, and an XML file. Advantage Integration Server is an e-business application solution offered by Computer Associates, the assignee of the present application.

The mapping rule object 300 also includes a destination logic 320 for identifying a destination to which a destination data will be provided. The destination can be, for example, a computer component, a process, a thread, an object, an application, an Advantage Integration Server entity, and/or an XML file. A computer component may be, for example, a computer-related entity like hardware, firmware, software, or a combination thereof. For example, a computer component can be, but is not limited to being, a process running on a processor, a processor, an object, an executable, a thread of execution, a program and a computer. A computer component can reside within a process and/or thread of execution and a computer component can be localized on one computer and/or distributed between two or more computers.

The mapping rule object 300 also includes a rule logic 330. A logic may be, for example, hardware, firmware, software and/or combinations of each to perform a function(s) or an action(s). Based on a desired application or needs, logic may include but is not limited to a software controlled microprocessor, discrete logic such as an application specific integrated circuit (ASIC), or other programmed logic device.

Logic may also be fully embodied as software. The rule logic 330 transforms the source data to the destination data. The rule logic 330 can perform the transformation by applying one or more transformation rules to the data and/or data definitions. The rule logic 330 for transforming the source data to the destination data can employ mapping rules to map fields, properties and so on between the source data received from the source and the destination data to be provided to the destination. These rules support data translation of data definition components like data type, name, and value.

Figure 3A:
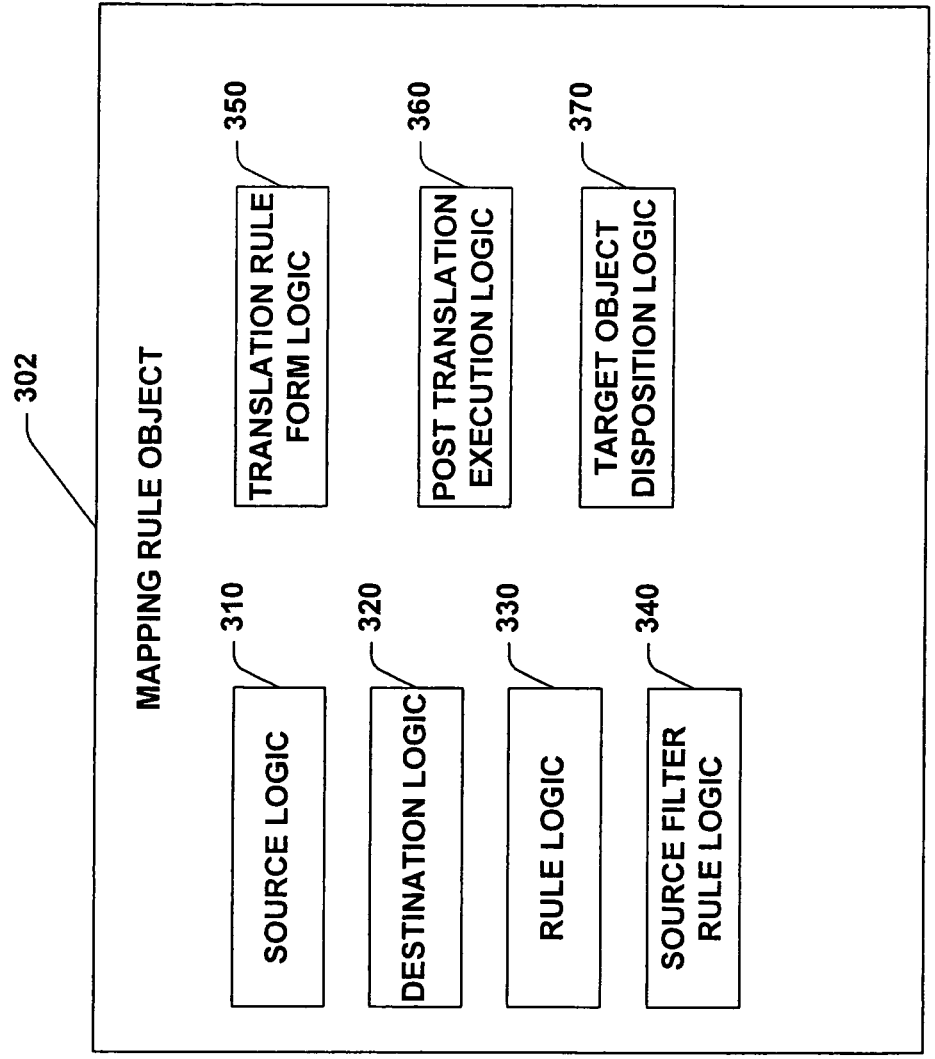
FIG. 3A illustrates an example mapping rule object.

FIG. 3A illustrates another example mapping rule object 302 that includes additional logics beyond that included in the base mapping rule object 300 illustrated in FIG. 3. These additional logics perform additional, optional functions. Thus, the mapping rule object 302 can also include a source filter rule logic 340. The source filter rule logic 340 facilitates selecting a source data to be transformed. For example, a mapping rule object 302 may have several source datas available from a variety of information providers. Determining which, if any, of these source data to transform and to provide to a downstream entity (e.g., process, object, application), is performed by the source filter rule logic 340. In one example, the source filter rule logic 340 includes one or more standard structured query language (SQL) rules. These rules can query a database to facilitate determining which, if any, source data to transform.

The mapping rule object 302 illustrated in FIG. 3A also includes a translation rule form logic 350 that facilitates controlling the form (e.g., object, file, record, discrete value) taken by the mapping rule object 302 and/or objects created by the mapping rule object 302. In one example, the translation rule form logic 350 facilitates selecting between an XML based object and an XML based file. Being able to determine the form a mapping rule object 302 and/or an object produced by a mapping rule object 302 will take facilitates having mapping rule objects take the form of shareable objects pursuant to the specification of object oriented software architectures.

The mapping rule object 302 also includes a post-translation execution logic 360. The post-translation execution logic 360 facilitates specifying a subsequent entity (e.g., object, process, thread, application) to invoke after the mapping rule object 302 completes transforming a first data to a second data. In one example, the subsequent entity is one of, a business process policy, a business process policy object, and a mapping rule object. Thus, the mapping rule object 302, via the post-translation execution logic 360, facilitates chaining together mapping rule objects 302 and/or other processes, which can lead to multi-stage translation/transformations. For example, imagine a first information provider that provides data in, for example, a French format. A mapping rule object 302 may be employed to convert the data to, for example, a German format. A subsequent entity (e.g., mapping rule object) may convert the data from the German format to a Polish format. Similarly, another subsequent entity may translate/transform the data from the Polish format to a Latvian format. Ultimately, another subsequent entity may transform the Latvian format to a Russian format. In this way, post-translation execution logics 360 facilitate performing multi-stage translations leading to translations that would otherwise be difficult, if possible at all. In one example, the subsequent entity can be invoked by one or more of, an application programming interface, a command line interface, a graphical user interface, a library call, a user context action, and a role context action.

The mapping rule object 302 also includes a target object disposition logic 370. The target object disposition logic 370 concerns how the mapping rule object 302 will interact with pre-existing objects generated by, for example, previous operations of a mapping rule object, and objects created by the mapping rule object 302. The target object disposition logic 370 is discussed in greater detail in connection with FIG. 4.

FIG. 4 illustrates an example target object disposition logic 400. The target object disposition logic 400 includes a delete and recreate logic 410. The delete and recreate logic 410 can be invoked by the target object disposition logic 400 and/or a mapping rule object to facilitate deleting objects that existed as of the last execution of a mapping rule object before creating new objects for the data transformation to be performed by the mapping rule object. The target object disposition logic 400 also includes an append new object logic 420. The append new object logic 420 creates new objects and adds them to a set of pre-existing objects that existed from, for example, a previous execution of a mapping rule object. The target object disposition logic 400 also includes an update by object logic 430. The update by object 430 updates pre-existing objects with current and/or new values or properties that are changed and/or added since the last time a mapping rule object was executed. The target object disposition logic 400 also includes a delete by object logic 440. The delete by object logic 440 deletes pre-existing values and/or properties that are no longer a part of a translation. The delete by object logic 440 also adds additional values and properties that are part of a new translation by an execution of a mapping rule object.

Figure 5:
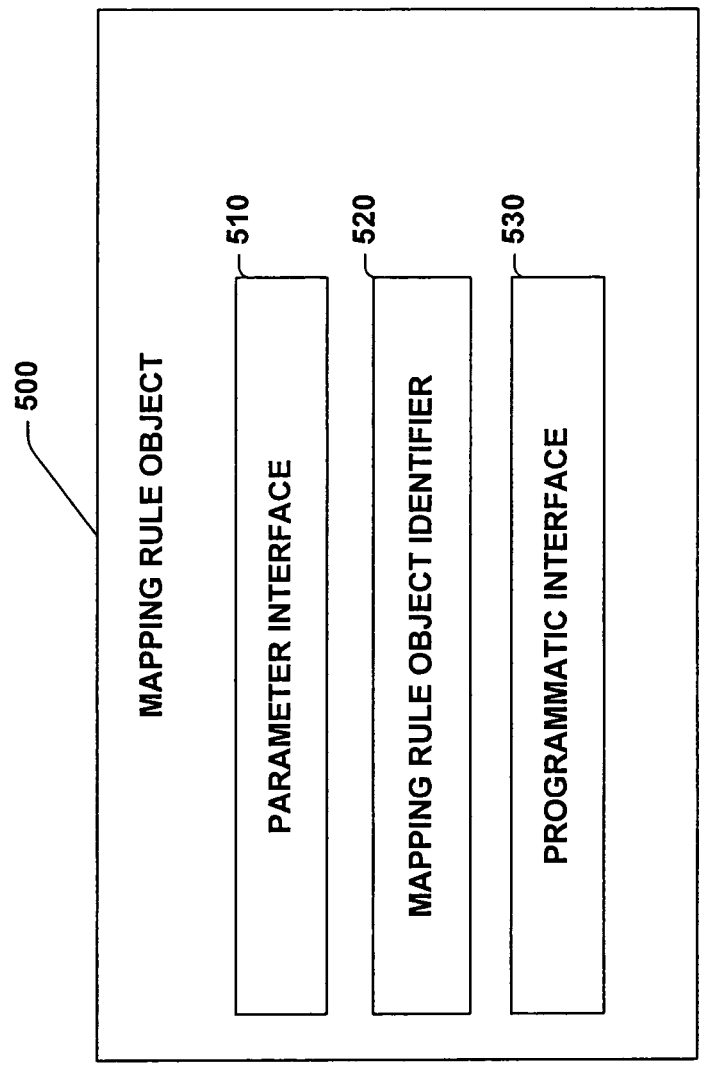
FIG. 5 illustrates an example mapping rule object.

FIG. 5 illustrates an example mapping rule object 500. The mapping rule object 500 includes a parameter interface 510 that facilitates controlling the operation of, for example, a source logic, a destination logic, a rule logic, a source filter rule logic, a translation rule form logic, a post-translation execution logic and a target object disposition logic. The parameter interface 510 facilitates receiving one or more parameters that can be data and/or control parameters for the various logics of a mapping rule object 500. In this manner a general purpose data transformation/translation mapping rule object is created that can be invoked in a number of manners. Thus, the mapping rule object 500 includes a programmatic interface 530 that facilitates receiving commands from various invoking entities. These invoking entities include, but are not limited to, an application programming interface, a command line interface, a graphical user interface, a library call, a user context, a role context, a business process policy, a business process policy object, and an object oriented message. The parameter interface 510 and/or the programmatic interface 530 may provide data and/or control concerning subsequent entities with which the mapping rule object 500 will interact. Thus, the mapping rule object 500 includes a mapping rule object identifier 520 that stores an identifier of mapping rule objects to be invoked upon the completion of processing by the mapping rule object 500. For example, upon completion of one or more of, the source logic, the destination logic, the rule logic, the source filter rule logic, the translation rule form logic, the post-translation and execution logic, and the target object disposition logic, the mapping rule object can involve another mapping rule object that can be located via the mapping rule object identifier 520.

Figure 6:
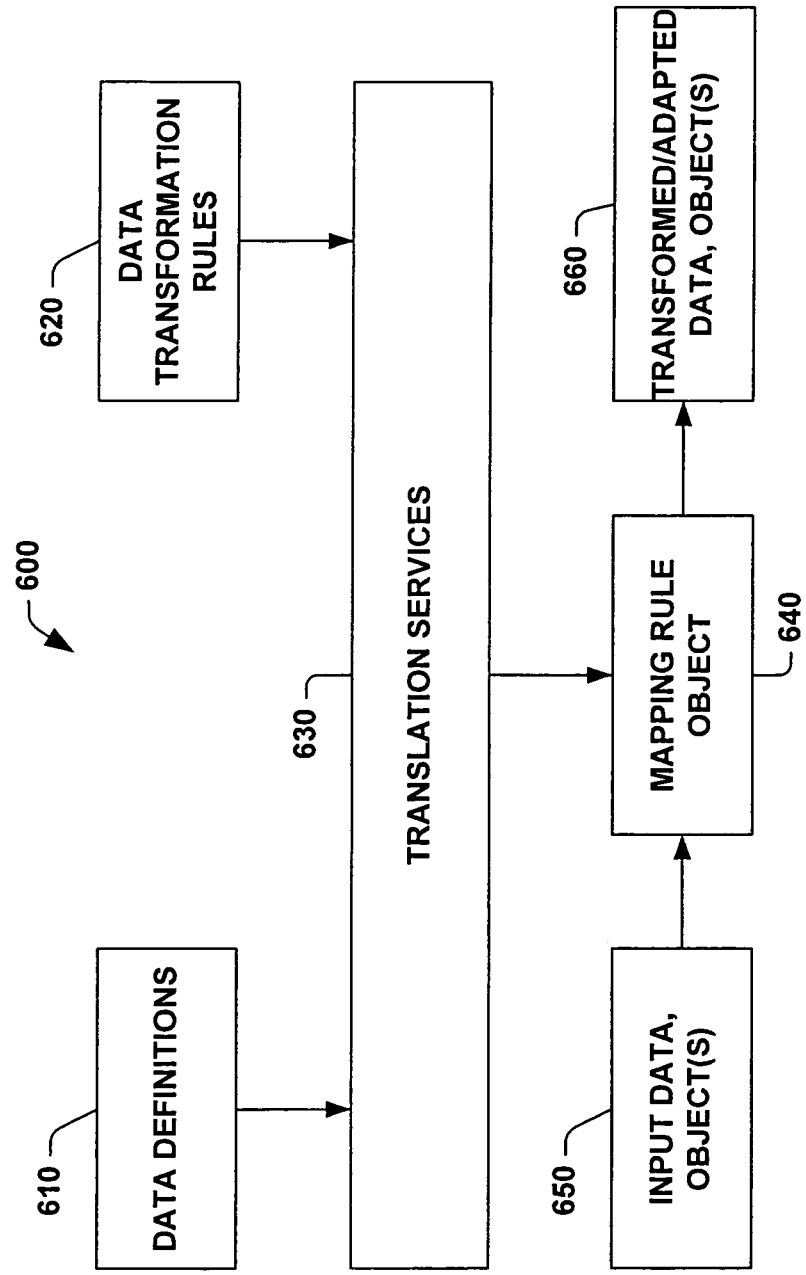
FIG. 6 illustrates an example system for transforming business process policy data.

FIG. 6 illustrates an example system 600 for transforming business process policy data. Data definitions 610 and data transformation rules 620 are provided to a translation services 630 that produces a mapping rule object 640. The mapping rule object 640 accepts first data (e.g. data, fields, records, objects) 650 and transforms them to a transformed adapted data 660 that can include, but is not limited to, values, fields, records, objects, and so on. By way of illustration, assume the mapping rule object 640 receives weather information from a number of weather information providers. For example, a first information provider may provide information concerning North American weather. This information may be provided in a first format. A European weather information provider may provide data in a second format, an Asian weather information provider can provide a third data in a third format, an African weather provider may provide data in a fourth format, a South American weather provider may provide information in a fifth format, a hurricane prediction information provider can provide data in a sixth format, and an earthquake prediction provider may provide information in a seventh format. An application that desires to integrate all this information may be faced with seven separate information formats. Thus, a mapping rule object 640 may employ several data definitions 610 and data transformation rules 620, to produce a transformed adapted data and/or objects 660 to the application that desires to integrate the weather, hurricane, and earthquake information for use, for example, in an oil distribution system.

Figure 7:
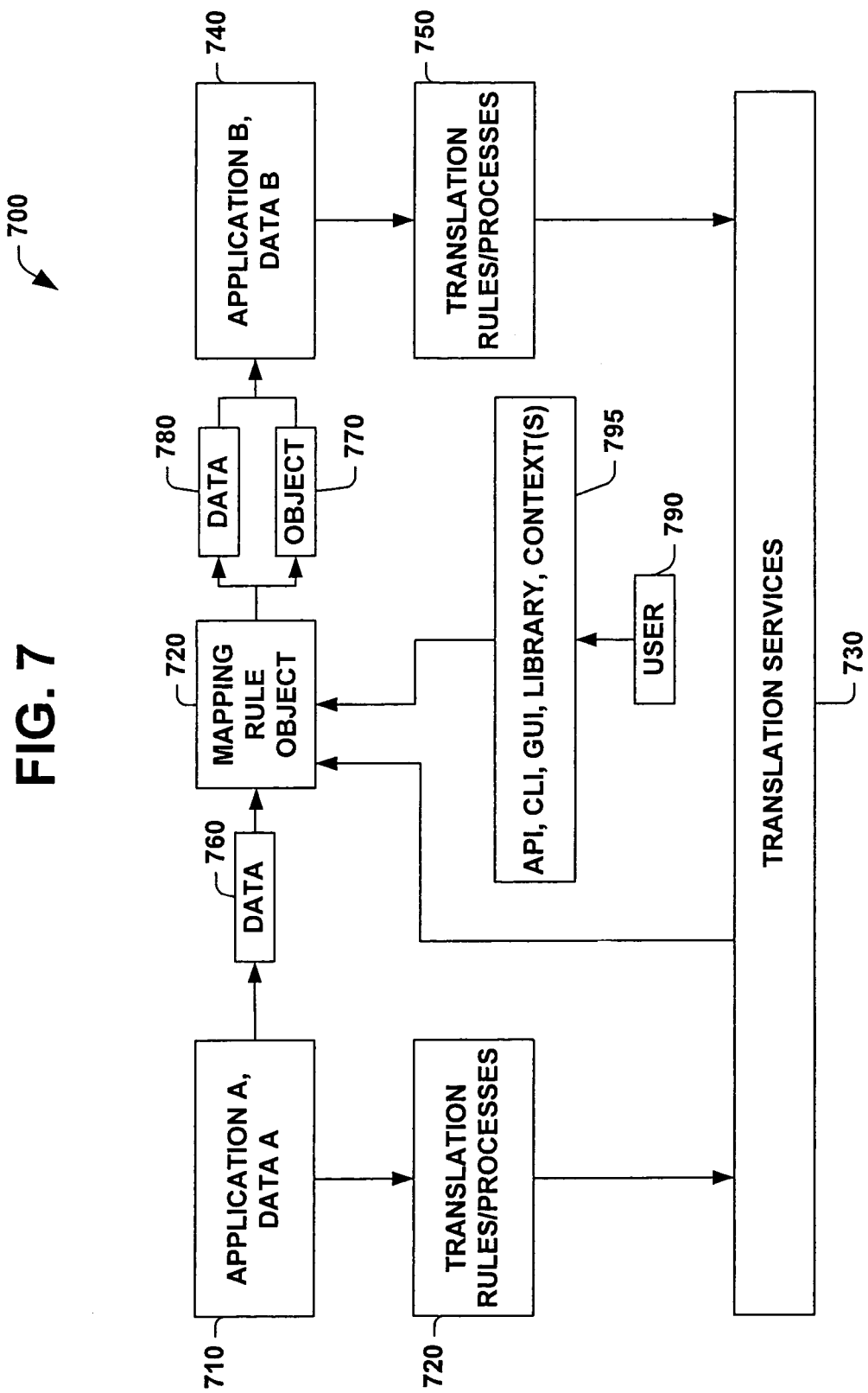
FIG. 7 illustrates an example system for facilitating interactions between business process policies.

FIG. 7 illustrates an example system 700 for facilitating interactions between business process policies. In system 700, an application 710 may interact with data in a format A. Thus, the application 710 may provide translation rules, processes, and data definitions 720 to a translation services 730. The translation services 730 may also receive translation rules/processes and data definitions at 750 from an application 740, that interacts with data in a format B. The translation services 730 can then produce a mapping rule object 720 that can accept a data 760 from the application 710 in the format A and produce an object 770 and/or a data 780 in a format B for use by the application 740. The mapping rule object 720 components can be parameterized and thus, the mapping rule object 720 can be invoked/controlled/adapted by entities providing these parameters. Furthermore, the mapping rule object 720 can be chained together with other mapping rule objects to provide execution processes for a sequence of business process policies. The mapping rule object 720 can interact with one or more interfaces 795 (e.g., a graphical user interface, a command line interface, an application programming interface, a library) to facilitate interactions with a user 790. For example, the user 790 may control the operation of the mapping rule object 720 through the interface 795 and/or the user 790 may be informed of the operations performed by the mapping rule objects 720 through the interface 795.

Figure 8:
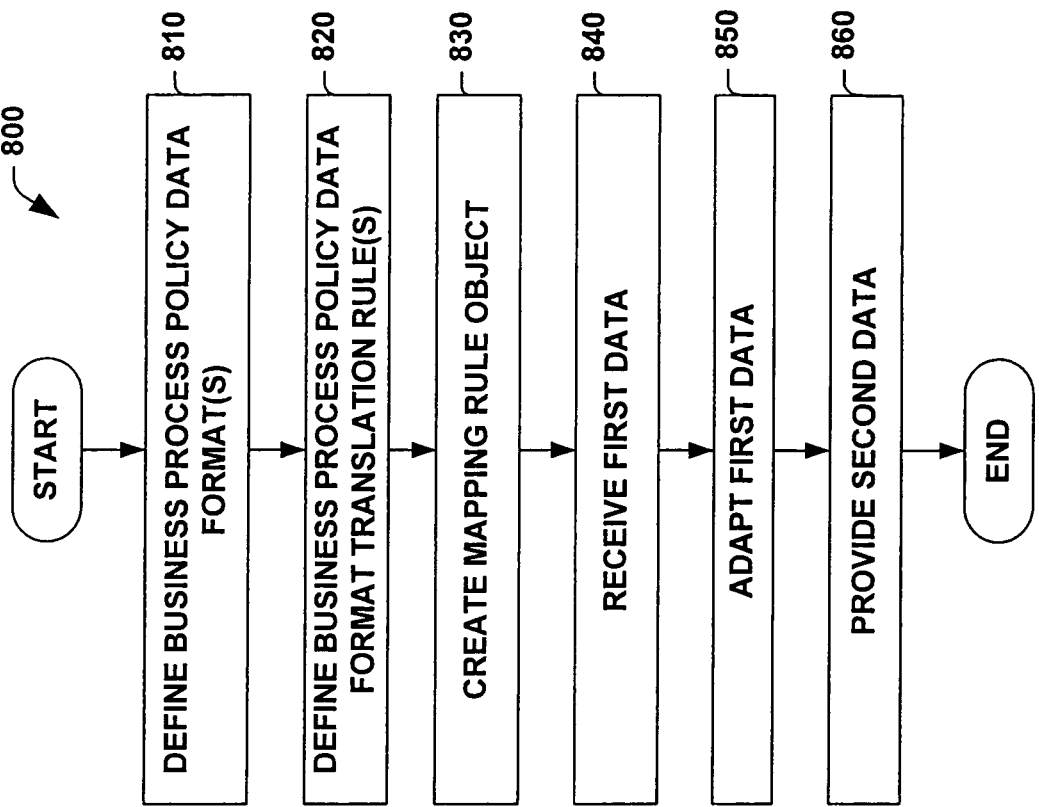
FIG. 8 is a flow chart of a portion of an example method for adapting business process policy data.
Figure 9:
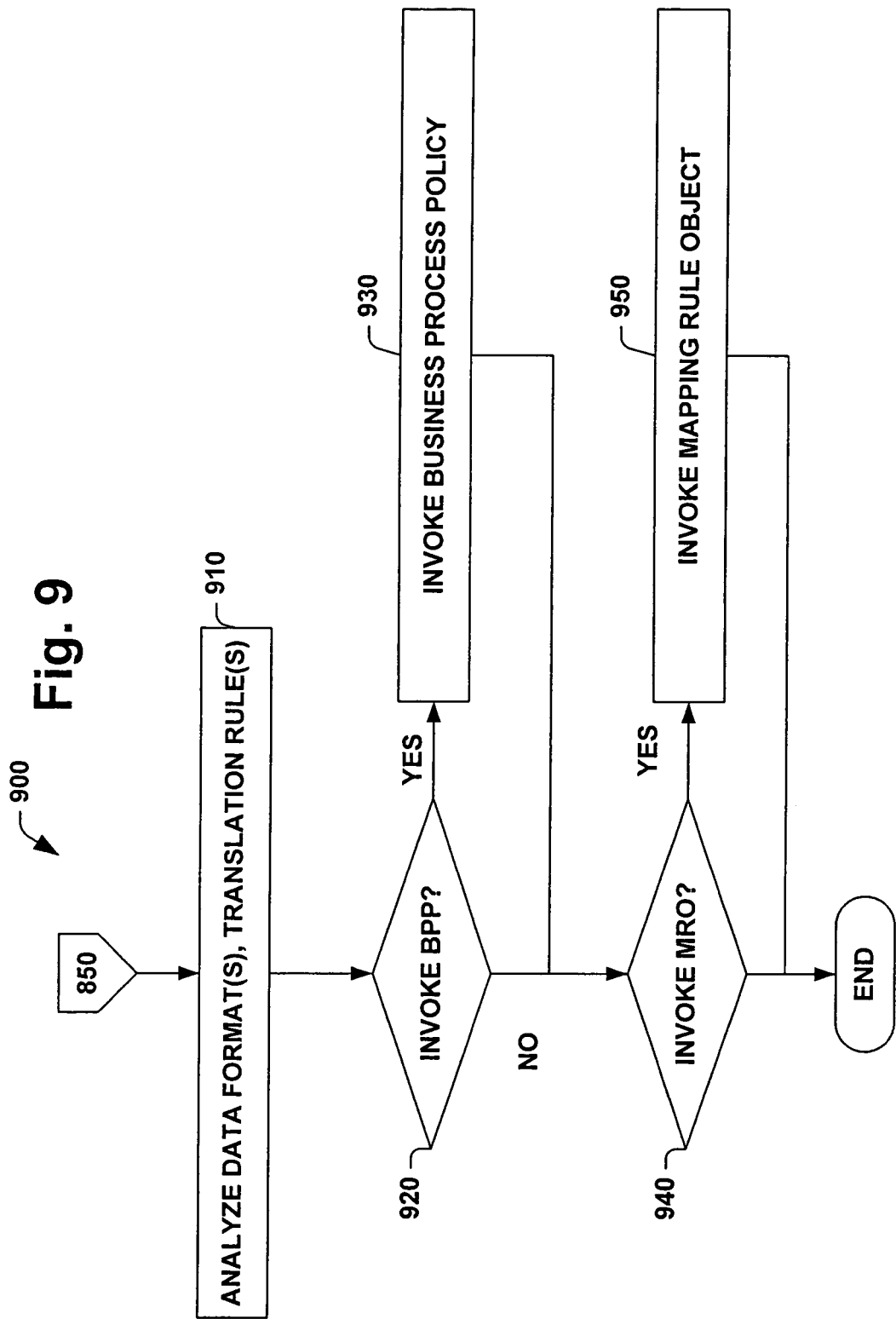
FIG. 9 is a flow chart of a portion of an example method for adapting business process policy data.
Figure 10:
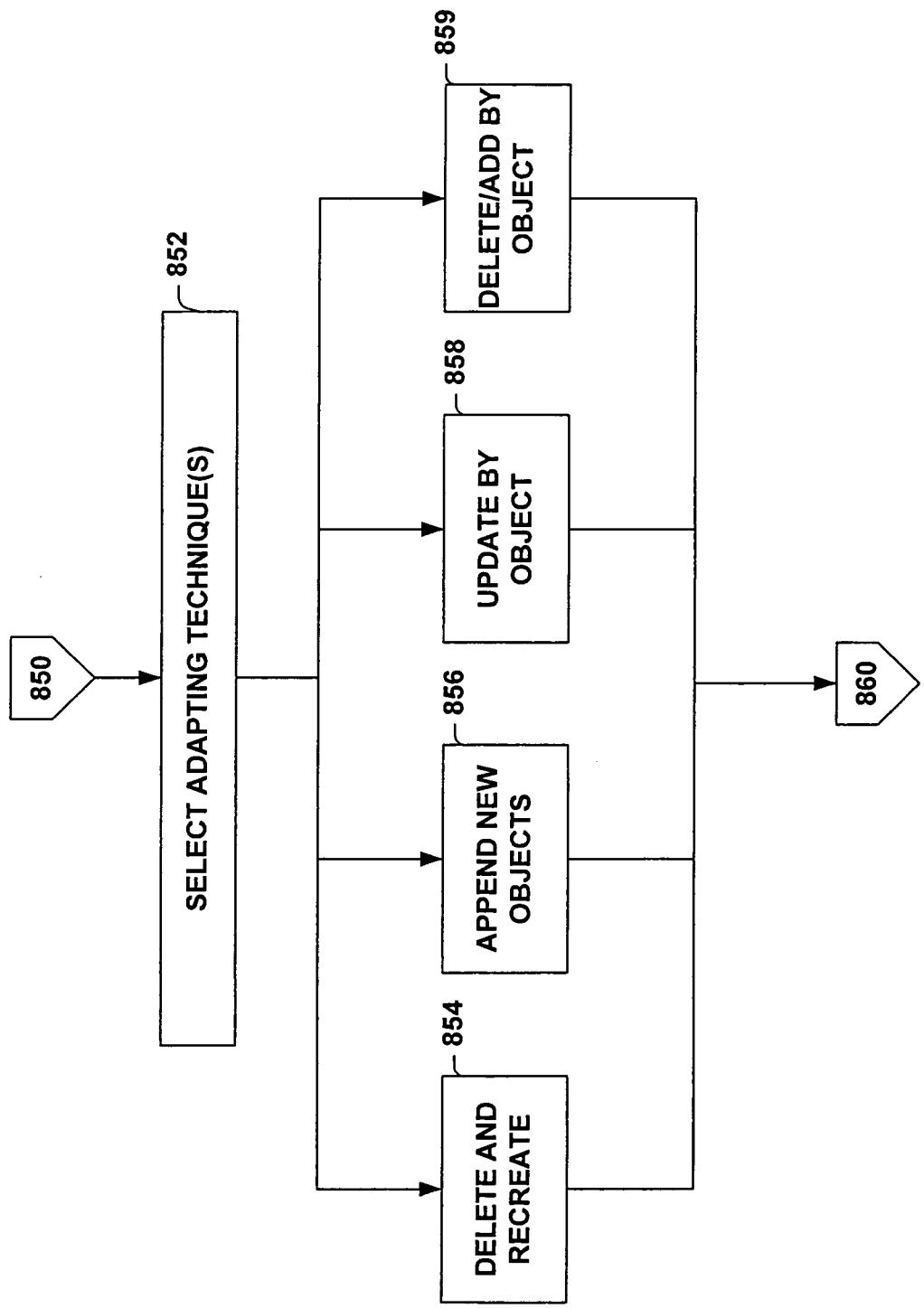
FIG. 10 is a flow chart of a portion of an example method for adapting business process policy data.

In view of the exemplary systems shown and described herein, methodologies that are implemented will be better appreciated with reference to the flow diagrams of FIGS. 8 through 10. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In the flow diagrams, rectangular blocks denote "processing blocks" that may be implemented, for example, in software. Similarly, the diamond shaped blocks denote "decision blocks" or "flow control blocks" that may also be implemented, for example, in software. Alternatively, and/or additionally, the processing and decision blocks can be implemented in functionally equivalent circuits like a digital signal processor (DSP), an application specific integrated circuit (ASIC), and the like.

A flow diagram does not depict syntax for any particular programming language, methodology, or style (e.g., procedural, object-oriented). Rather, a flow diagram illustrates functional information one skilled in the art may employ to program software, design circuits, and so on. It is to be appreciated that in some examples, program elements like temporary variables, routine loops, and so on are not shown.

In one example, methodologies can be implemented as computer executable instructions and/or operations and the instructions and/or operations can be stored on computer readable media including, but not limited to, an application specific integrated circuit (ASIC), a compact disc (CD), a digital versatile disk (DVD), a random access memory (RAM), a read only memory (ROM), a programmable read only memory (PROM), an electronically erasable programmable read only memory (EEPROM), a disk, a carrier wave, and a memory stick.

Referring now to FIG. 8, an example method 800 for adapting business process policy data is illustrated. At 810, a business process policy data format is defined. For example, names, fields, values, types, and other data defining points can be provided to produce the business process policy data format definition. At 820, business process policy data format translation rules are defined. By way of illustration, a rule for translating a long field name to a short field name can be provided as can a rule for converting a signed integer to an unsigned integer.

At 830, a mapping rule object is created. A mapping rule object can, for example, adapt a first business process policy data formatted in a first business process policy data format for use by a second business process policy in a second business process policy data format. The first format may be, for example, a source format and the second format may be, for example, a destination format. For example, the mapping rule object created at 830 can accept data from an information provider (e.g., news service) and adapt it for use by a supply chain application. Since the news service and the supply chain operation may have different data formats, the mapping rule object facilitates adapting the news service data to a format useable by the supply chain application.

At 840 a first data formatted in a first business process policy data format is received. For example, an object, a record, a field, a value, and so on may be received as the first data at 840. The first data may be received from, for example, an information provider like a news service, a remote computer, a supplier computer, and a bot.

At 850, the first data is adapted to a second data formatted in a second business process policy data format. The adaptation can be controlled by one or more parameters supplied to the mapping rule object created at 830. Furthermore, the mapping rule object that will perform the adaptation can be invoked via different programmatic paradigms (e.g., API, CLI) and can be invoked on a variety of different platforms including, but not limited to, a JAVA platform, an XML platform, a COM platform and an ODBC platform.

At 860, the second data is provided to a data destination. The data destination may be, for example, an object, a process, a thread, a business process policy, and/or a business process policy object.

FIG. 9 is a flowchart of a portion of an example method 900 for adapting business process policy data. Method 900 can pick up, for example, after block 850 from FIG. 8. At 910, the method may analyze one or more of the first data format, the second data format, and business process policy data format translation rules employed by a mapping rule object to adapt the first data format to the second data format. At 920, based on the analysis at 910, a determination is made concerning whether to invoke a business process policy. If the determination at 920 is yes, than at 930, one or more business process policies can be invoked. Being able to selectively invoke business process policies based, at least in part, on the data formats and/or the data format translation rules facilitates chaining together business process policy processing to provide configurable, adoptable policy processing.

At 940, a determination is made concerning whether to invoke one or more mapping rule objects. A determination can be made, at least in part, on the analysis performed at 910. If the determination at 940 is yes, than at 950 a mapping rule object can be invoked. Once again this facilitates chaining together mapping rule object processing which in turn facilitates flexible, multi-stage translation/transformations.

FIG. 10 is a flowchart of a portion of an example method for adapting business process policy data that illustrates a plurality of data adapting techniques. The processing illustrated in FIG. 10 can be inserted, for example, after block 850 in FIG. 8. At 852, a determination is made concerning which type of adapting technique to apply. The adapting techniques concern how objects created by a mapping rule object will interact with pre-existing objects created, for example, by previous executions of the mapping rule object.

At 854, processing that includes selectively deleting pre-existing objects and creating new objects can be performed. At 856, processing that includes creating new objects and adding them to a set of pre-existing objects is illustrated. At 858, processing that updates one or more pre-existing objects created by a prior operation of a mapping rule object occurs. This updating can include changing one or more of a field, a value, a name, a record, and so on in a pre-existing object. At 859, processing that includes selectively deleting portions of a pre-existing object and selectively adding portions to a pre-existing object is illustrated. The portions that can be selectively deleted include, but are not limited to, a field, a value, a record and so on. Similarly, components that can be added include, but are not limited to, a field, a value, and a record.

What has been described above includes several examples. It is, of course, not possible to describe every conceivable combination of components or methodologies for purposes of describing the systems, methods, and computer readable media associated with business process policy data. However, one of ordinary skill in the art may recognize that further combinations and permutations are possible. Accordingly, this application is intended to embrace such alterations, modifications, and variations that fall within the scope of the appended claims. Furthermore, to the extent that the term "includes" is employed in the detailed description or the claims, such term is intended to be inclusive in a manner similar to the term "comprising" as that term is interpreted when employed as a transitional word in a claim.

What is claimed is:

1. A system for transforming a first data in a first format to a second data in a second format, comprising:
a processor;
a translation services logic for:
receiving, from a first application that interacts with data in a first pre-transformation format, a data definition and a data transformation rule;
receiving, from a second application that interacts with data in a second post-transformation format, a data definition and a data transformation rule; and
creating a mapping rule object based on:
the data definition and the data transformation rule received from the first application that interacts with the data in the first pre-transformation format; and
the data definition and the data transformation rule received from the second application that interacts with the data in the second post-transformation format;
the mapping rule object for:
receiving a first data in a first format; and
transforming the first data in the first format to a second data in a second format according to the data definition and the data transformation rule; and
the translation services logic comprising post-translation execution logic that chains the mapping rule object to at least one additional mapping rule object resulting in multi-stage transformation.

2. The system of claim 1, the mapping rule object comprising:
a source logic for identifying a source from which the first data will be received;
a destination logic for identifying a destination to which the second data will be provided; and
a rule logic for transforming the first data to the second data.

3. The system of claim 2, where the source is an information provider.

4. The system of claim 3, where the information provider is an XML file.

5. The system of claim 2, where the destination is an XML file.

6. The system of claim 2, the mapping rule object comprising a source filter rule logic for selecting the first data to be transformed.

7. The system of claim 6, where the first data is an object.

8. The system of claim 6, where the source filter rule logic comprises a structured query language rule.

9. The system of claim 6, comprising a translation rule form logic for controlling a form taken by the mapping rule object.

10. The system of claim 9, where the form is one of, an XML based object, and an XML based file.

11. The system of claim 9, comprising a post translation execution logic for specifying a subsequent entity to invoke after the mapping rule object completes transforming the first data to the second data.

12. The system of claim 11, where the subsequent entity is one, of a business process policy, a business process policy object, and a mapping rule object.

13. The system of claim 11, where the subsequent entity is invokeable by one or more of, an application programming interface, a command line interface, a graphical user interface, a library call, a user context action, and a role context action.

14. The system of claim 11, comprising a target object disposition logic.

15. The system of claim 14, where the target object disposition logic comprises one or more of, a delete and recreate logic, an append new object logic, an update by object logic, and a delete by object logic.

16. The system of claim 14, comprising a parameter interface for receiving a parameter for selectively controlling the operation of one or more of, the source logic, the destination logic, the rule logic, the source filter rule logic, the translation rule form logic, the post translation execution logic, and the target object disposition logic.

17. The system of claim 14, comprising a mapping rule object identifier for storing an identifier of one or more mapping rule objects to invoke upon completing the processing of one or more of, the source logic, the destination logic, the rule logic, the source filter rule logic, the translation rule form logic, the post translation execution logic, and the target object disposition logic.

18. The system of claim 14, comprising a programmatic interface for receiving one or more commands from one or more of, an application programming interface, a command line interface, a graphical user interface, a library call, a user context, a role context, a business process policy, a business process policy object, and an object oriented message.

19. A computer readable medium storing computer executable components of the system of claim 14.

20. A computer implemented method for adapting business process policy data, comprising:
receiving, from a first application that interacts with business process policy data in a first pre-transformation format, a data definition comprising one or more business process policy data formats;
receiving, from the first application that interacts with the business process policy data in the first pre-transformation format, a data transformation rule comprising one or more business process policy data format translation rules;
receiving, from a second application that interacts with the business process policy data in a second post-transformation format; a data definition comprising one or more business process policy data formats; and
receiving from the second application that interacts with the business process policy data in the second post-transformation format, a data transformation rule comprising one or more business process policy data format translation rules;
using a translation services logic to create, based on the data definition and the data transformation rules received from the first application that interacts with the data in the pre-transformation format and the second application that interacts with the data in the post-transformation format, a mapping rule object for:
receiving a first business process policy data formatted in a first business process policy data format; and
adapting the first business process policy data formatted in the first business process policy data format for use by a second business process policy in a second business process policy data format;
using post-translation execution logic to chain the mapping rule object to at least one additional mapping rule object; and
executing the post-translation execution logic to result in multi-stage transformation.

21. The method of claim 20, comprising:
receiving a first data formatted in a first business process policy data format;
adapting the first data to a second data formatted in a second business process policy data format according to the one or more defined business process policy data formats and the one or more defined business process policy data format translation rules; and
providing the second data to a data destination.

22. The method of claim 21, comprising selectively invoking one or more business process policies based, at least in part, on the first data format, the second data format, and a business process policy data format translation rule for adapting the first data format to the second data format.

23. The method of claim 21, comprising selectively invoking one or more mapping rule objects based, at least in part, on the first data format, the second data format, and a business process policy data format translation rule for adapting the first data format to the second data format.

24. The method of claim 21, where adapting a first data formatted in a first business process policy data format to a second data formatted in a second business process policy data format comprises:
selectively deleting one or more pre-existing objects created by a prior operation of a mapping rule object; and
creating one or more new objects.

25. The method of claim 21, where adapting a first data formatted in a first business process policy data format to a second data formatted in a second business process policy data format comprises:
creating one or more new objects; and
adding the one or more new objects to a set of pre-existing objects created by a prior operation of a mapping rule object.

26. The method of claim 21, where adapting a first data formatted in a first business process policy data format to a second data formatted in a second business process policy data format comprises updating one or more pre-existing objects created by a prior operation of a mapping rule object.

27. The method of claim 21, where adapting a first data formatted in a first business process policy data format to a second data formatted in a second business process policy data format comprises:
selectively deleting one or more of, a field, a value, and a record from a pre-existing object created by a prior operation of a mapping rule object; and
selectively adding one or more of, a field, a value, and a record to a pre-existing object created by a prior operation of a mapping rule object.

28. A computer readable medium storing computer executable instructions, the computer executable instructions operating, when executed by the processor, to perform the method of claim 21.

29. A system for facilitating interactions between business process policies embodied in computer components, comprising:
means for receiving, from a first application that interacts with business process policy data in a first pre-transformation format, a data definition comprising a business process policy data format;
means for receiving, from the first application that interacts with the business process policy data in a second post-transformation format, a data transformation rule comprising a process for converting a first data in a first business process policy data format to a second data in a second business process policy format;
means for receiving, from a second application that interacts with the business process policy data in a second post-transformation format; a data definition comprising one or more business process policy data formats;
means for receiving from the second application that interacts with the business process policy data in the second post-transformation format, a data transformation rule comprising one or more business process policy data format translation rules;
means for creating, based on the data definition and the data transformation rule received from the first application that interacts with the data in the first pre-transformation format and the second application that interacts with the data in the second post-transformation format, a mapping rule object;

means for receiving the first data at the mapping rule object; means for converting, at the mapping rule object, the first data to the second data according to the data definition and the data transformation rule received from the first application that interacts with the data in the first pre-transformation format and the second application that interacts with the data in the second post-transformation format; and means for providing the second data to a data destination;

means for chaining by post translation execution logic the mapping rule object to at least one additional mapping rule object; and means for executing the post-translation execution logic to result in multi-stage transformation.

30. The system of claim 1 wherein:

the data definition comprises a first data definition and a second data definition;

the data transformation rule comprises a first data transformation rule and a second data transformation rule;

the translation services logic operating to:
- receive the first data definition and the first data transformation rule from a source application;
- receive the second data definition and the second data transformation rule from a target application; and
- create the mapping rule object using the first and second data definitions and the first and second data transform rules; and the mapping rule object is operable to:
- receive the first data in the first format from the source application; and
- transform the first data in the first format to a second data in a second format according to the data definition and the data transformation rule.

\* \* \* \* \*